(12) United States Patent
Anand et al.

(10) Patent No.: US 12,302,306 B2
(45) Date of Patent: May 13, 2025

(54) MODEL-ASSISTED DEEP REINFORCEMENT LEARNING BASED SCHEDULING IN WIRELESS NETWORKS

(71) Applicant: Intel Corporation, Santa Clara, CA (US)

(72) Inventors: Arjun Anand, Santa Clara, CA (US); Ravikumar Balakrishnan, Beaverton, OR (US); Vallabhajosyula S. Somayazulu, Portland, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 491 days.

(21) Appl. No.: 17/479,991

(22) Filed: Sep. 20, 2021

(65) Prior Publication Data

US 2022/0007382 A1     Jan. 6, 2022

Related U.S. Application Data

(60) Provisional application No. 63/088,989, filed on Oct. 7, 2020.

(51) Int. Cl.
*G06N 20/00*     (2019.01)
*G06N 3/04*      (2023.01)
(Continued)

(52) U.S. Cl.
CPC .............. *H04W 72/12* (2013.01); *G06N 3/04* (2013.01); *G06N 3/08* (2013.01); *H04L 43/0888* (2013.01); *H04W 88/08* (2013.01)

(58) Field of Classification Search
CPC . H04W 72/12; H04W 88/08; H04W 72/0446; H04W 84/12; H04W 72/121;
(Continued)

(56) References Cited

U.S. PATENT DOCUMENTS 11,206,549 B1 *  12/2021  Eyuboglu ............. H04W 16/16
2016/0270073 A1 *  9/2016  Ye ..................... H04W 28/0864
(Continued)

FOREIGN PATENT DOCUMENTS

CN     111628855 B  *  6/2021  .......... G06N 3/0454
WO     2020187004 A1     9/2020

OTHER PUBLICATIONS

Balakrishnan, Ravikumar et al., "Deep Reinforcement Learning Based Traffic-and-Channel-Aware OFDMA Resource Allocation," Intel Labs, USA, Dept. of Electrical and Computer Engineering, Northeastern University, Boston, MA, 2019 IEEE Global Communications Conference (GLOBECOM), Dec. 9-13, 2019 (6 pages).
(Continued)

*Primary Examiner* — Schquita D Goodwin
(74) *Attorney, Agent, or Firm* — Alliance IP, LLC

(57) ABSTRACT

In one embodiment, an apparatus of an access point (AP) node of a network includes an interconnect interface to connect the apparatus to one or more components of the AP node and a processor to: access scheduling requests from a plurality of devices, select a subset of the devices for scheduling of resource blocks in a time slot, and schedule wireless resource blocks in the time slot for the subset of devices using a neural network (NN) trained via deep reinforcement learning (DRL).

25 Claims, 10 Drawing Sheets

(51) Int. Cl.
*G06N 3/08* (2023.01)
*H04W 72/12* (2023.01)
*H04L 43/0888* (2022.01)
*H04W 88/08* (2009.01)

(58) Field of Classification Search
CPC ...... H04W 72/21; H04W 72/542; G06N 3/04; G06N 3/08; G06N 3/065; G06N 3/006; G06N 3/02; G06N 20/00; H04L 43/0888
See application file for complete search history.

(56) References Cited

U.S. PATENT DOCUMENTS

| | | | | |
|---|---|---|---|---|
| 2019/0124667 A1* | 4/2019 | Comsa | ............... | H04W 72/12 |
| 2019/0197896 A1* | 6/2019 | Bakhishev | ............ | G06F 18/285 |
| 2020/0304269 A1* | 9/2020 | Zhang | ................ | H04L 1/1614 |
| 2021/0045109 A1* | 2/2021 | Lee | ..................... | H01M 10/425 |
| 2021/0329668 A1* | 10/2021 | Singh Shekhawat | .. | G06N 3/006 |
| 2021/0368481 A1* | 11/2021 | Jo | ........................ | H04W 72/21 |
| 2022/0070710 A1* | 3/2022 | Lim | ..................... | H04W 72/04 |
| 2022/0095119 A1* | 3/2022 | Doshi | ................ | H04W 24/08 |
| 2022/0132522 A1* | 4/2022 | Wei | ..................... | H04W 72/23 |
| 2022/0217792 A1* | 7/2022 | Yu | ........................ | G06N 3/044 |
| 2022/0278771 A1* | 9/2022 | Park | ..................... | H04L 5/0044 |
| 2023/0072585 A1* | 3/2023 | Han | ...................... | G06N 20/00 |
| 2023/0262683 A1* | 8/2023 | Saxena | ................ | H04W 72/54 |
| | | | | 370/329 |
| 2023/0319617 A1* | 10/2023 | Manolakos | ........... | H04W 24/10 |
| | | | | 370/328 |

OTHER PUBLICATIONS

Battacharyya, Rajarshi et al., "QFlow: A Reinforcement Learning Approach to High QoE Video Streaming Over Wireless Networks," Proceedings of the Twentieth ACM International Symposium on MobileAd Hoc Networking and Computing, Mobihoc 19, (Jul. 2-5, 2019); Association for Computing Machinery, 2019, (10 pages).

Bhattacharyya, Rajarshi et al., "QFlow: A Learning Approach to High QoE Video Streaming at the Wireless Edge," Texas A&M University, College Station; CAIDA, San Francisco, CA May 13, 2020 (14 pages).

Netherlands Patent Office; Search Report issued for Patent Application No. NL 2029288, dated May 25, 2022; 9 pages including English translation.

* cited by examiner

MODEL-ASSISTED DEEP REINFORCEMENT LEARNING BASED SCHEDULING IN WIRELESS NETWORKS

CROSS REFERENCE TO RELATED APPLICATIONS

This application claims the benefit of, and priority from, U.S. Provisional Patent Application No. 63/088,989, entitled "MODEL-ASSISTED DEEP REINFORCEMENT LEARNING BASED SCHEDULING IN WIRELESS NETWORKS" and filed Oct. 7, 2020, the entire disclosure of which is incorporated herein by reference.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications, coordinated service instances and machine learning, such as federated machine learning, among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
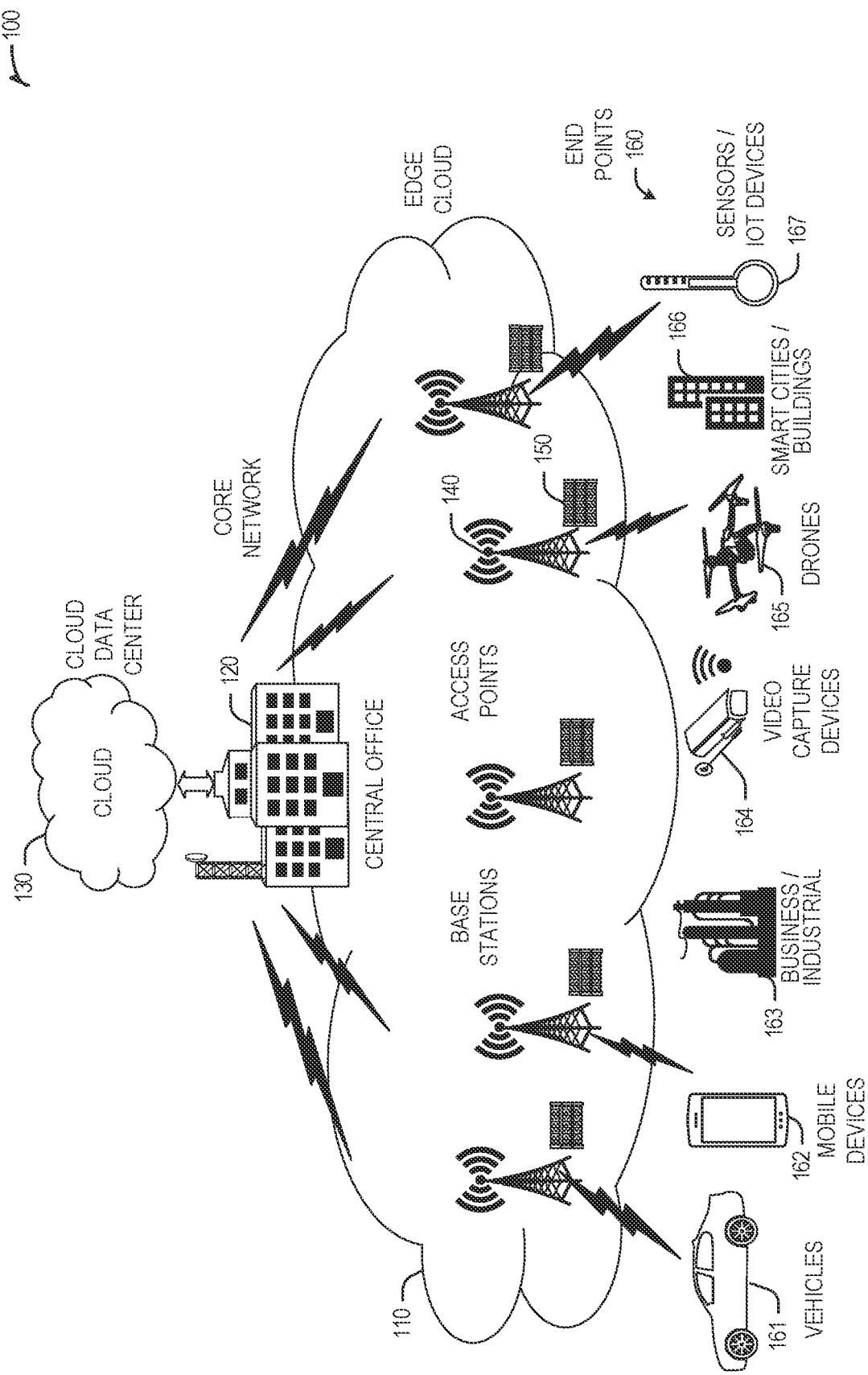
FIG. 1 illustrates an overview of an edge cloud configuration for edge computing.

The following embodiments generally relate to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment.

In the following description, methods, configurations, and related apparatuses are disclosed for various improvements to the configuration and functional capabilities of an edge computing architecture and an implementing edge computing system. These improvements may benefit a variety of use cases, especially those involving multiple stakeholders of the edge computing system—whether in the form of multiple users of a system, multiple tenants on a system, multiple devices or user equipment interacting with a system, multiple services being offered from a system, multiple resources being available or managed within a system, multiple forms of network access being exposed for a system, multiple locations of operation for a system, and the like With the illustrative edge networking systems described below, computing and storage resources are moved closer to the edge of the network (e.g., closer to the clients, endpoint devices, or "things"). By moving the computing and storage resources closer to the device producing or using the data, various latency, compliance, and/or cost constraints may be achievable relative to a standard networked (e.g., cloud computing) system. To do so, in some examples, pools of compute, memory, and/or storage resources may be located in, or otherwise equipped with, local servers, routers, and/or other network equipment. Such local resources facilitate the satisfying of constraints placed on the system. For example, the local compute and storage resources allow an edge system to perform computations in real-time or near real-time, which may be a consideration in low latency use-cases such as autonomous driving, video surveillance, and mobile media consumption. Additionally, these resources will benefit from service management in an edge system which provides the ability to scale and achieve local SLAs, manage tiered service requirements, and enable local features and functions on a temporary or permanent basis.

An illustrative edge computing system may support and/ or provide various services to endpoint devices (e.g., client user equipment (UEs)), each of which may have different requirements or constraints. For example, some services may have priority or quality-of-service (QoS) constraints (e.g., traffic data for autonomous vehicles may have a higher priority than temperature sensor data), reliability and resiliency (e.g., traffic data may require mission-critical reliability, while temperature data may be allowed some error variance), as well as power, cooling, and form-factor constraints. These and other technical constraints may offer significant complexity and technical challenges when applied in the multi-stakeholder setting.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
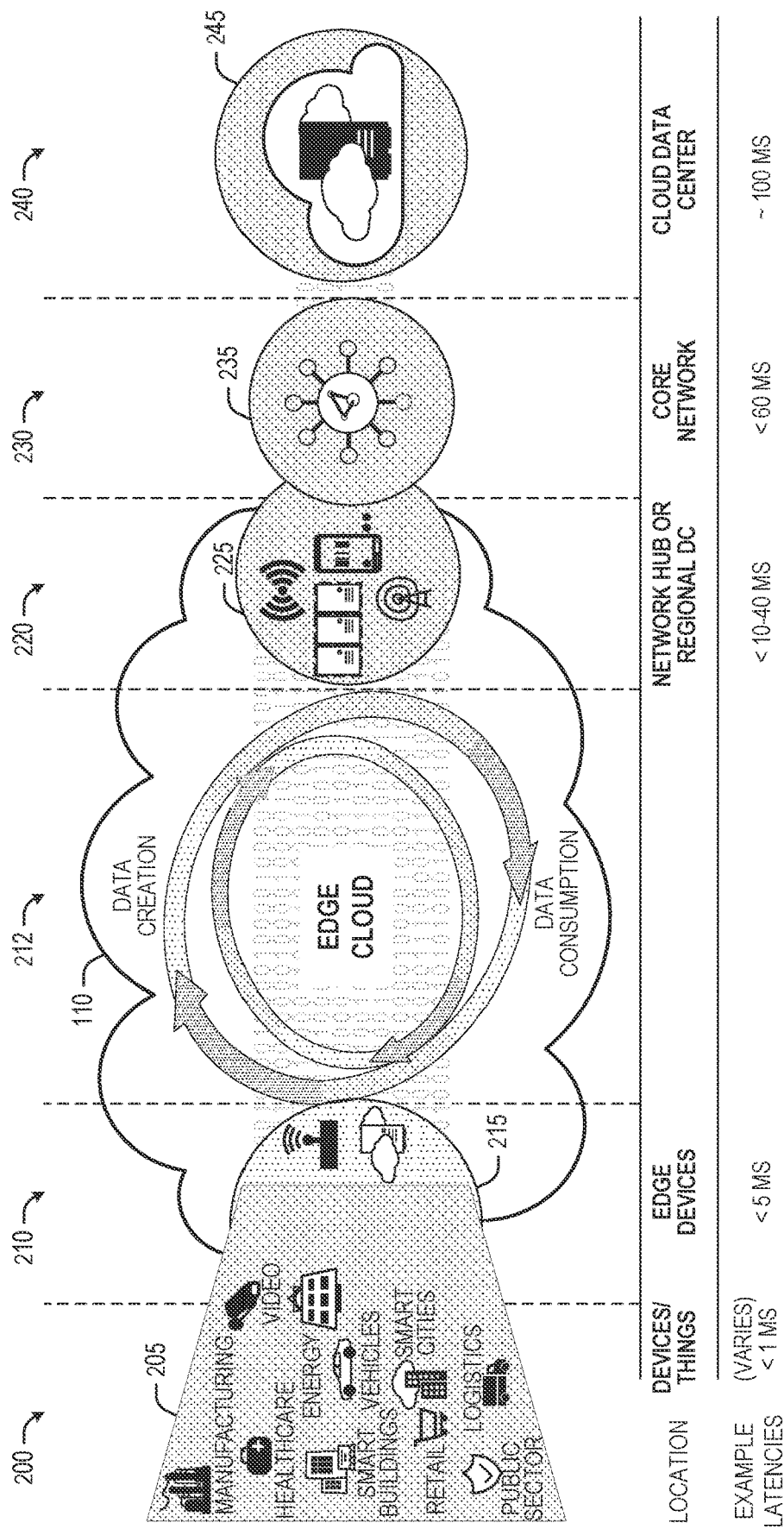
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3 GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility.

Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
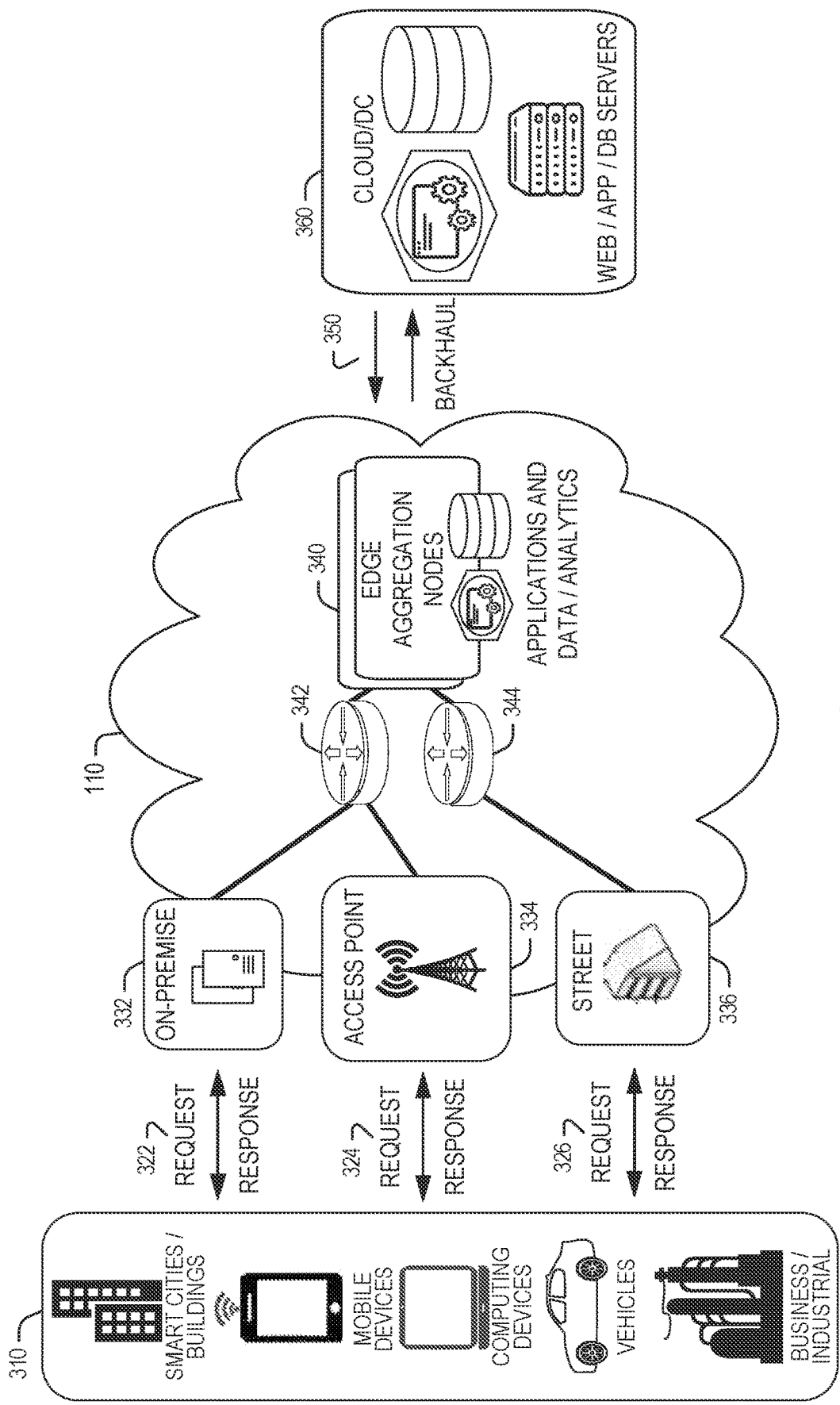
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
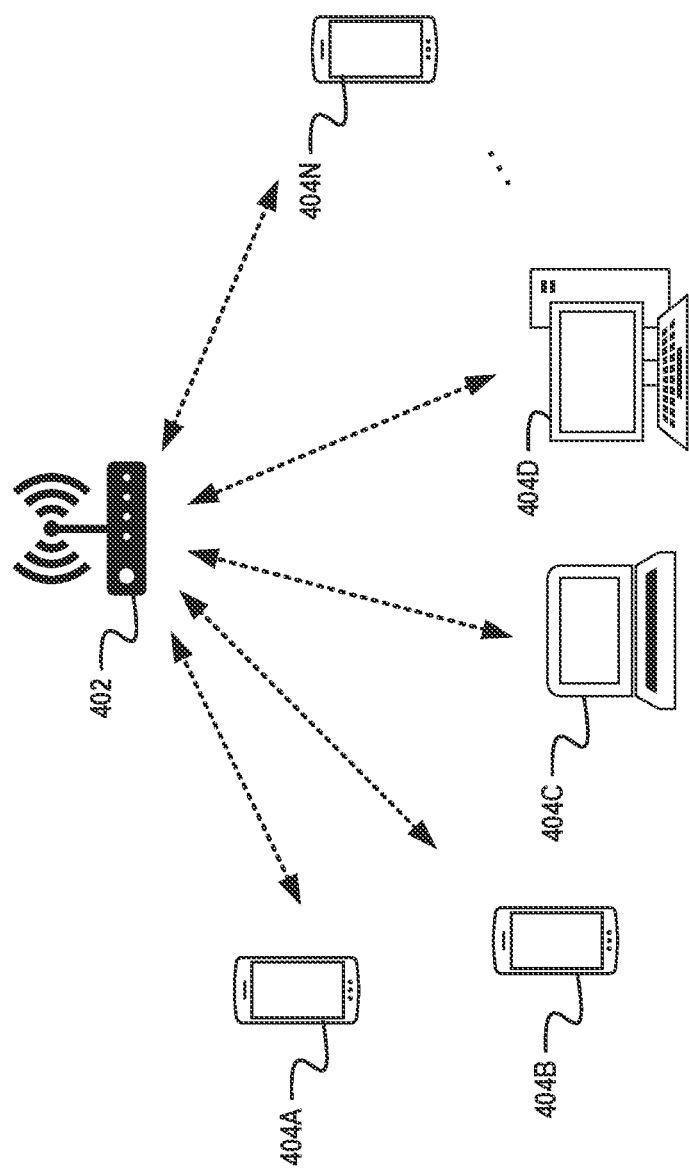
FIG. 4 illustrates an example approach for networking in a wireless computer network.
Figure 10:
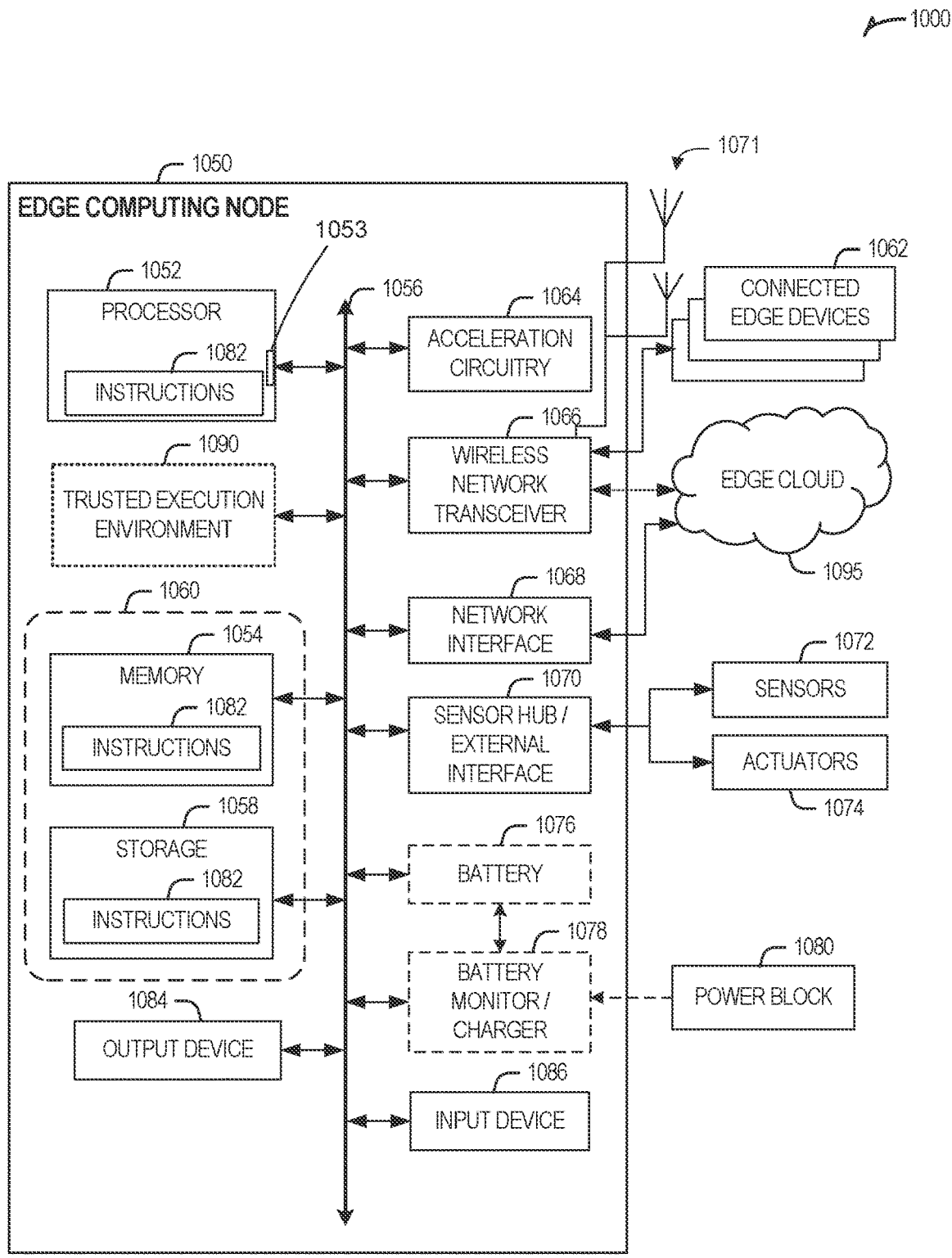
FIG. 10 provides an overview of example components within a computing device in an edge computing system.

In FIG. 4, various client devices 404 (e.g., mobile devices 404A, 404B, 404N, laptop computer 404C, desktop computer 404D, etc.) exchange information with an access point 402 wirelessly according to a wireless communication protocol. In certain embodiments, the devices shown may be part of a wireless local area network (WLAN) and may communicate via an IEEE 802.11-based protocol, such as, for example, IEEE 802.11.a, 802.11.b, 802.11.g, 802.11.n, 802.11.ac, or IEEE 802.11ax. In such instances, the access point 402 may be referred to as a router or access point (AP) and the client devices 404 may be referred to as stations or STAs. In other embodiments, the devices may be part of a cellular (e.g., 4G, 5G, 6G) network, and the access point 402 may be referred to as a base station (BS) or eNodeB (eNB) and the client devices 404 may be referred to as user equipment (UE) devices or UEs. The access point 402, client devices 404, or both may be implemented in a similar manner as shown in FIG. 10.

Figure 5:
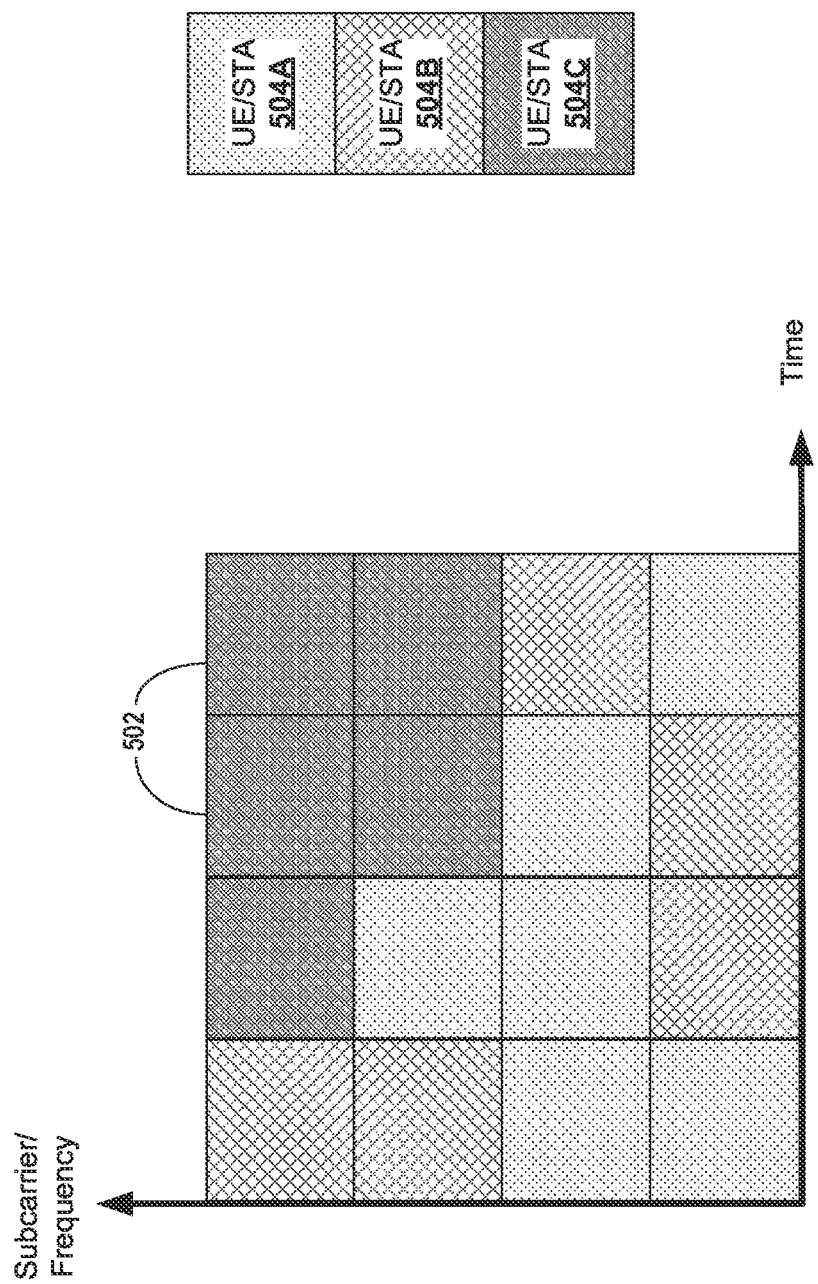
FIG. 5 illustrates example resource blocks/units in an Orthogonal Frequency Division Multiple Access (OFDMA)-based protocol.

In any of the above networking scenarios, wireless connections between the client devices and access points/base stations may be according to an Orthogonal Frequency Division Multiple Access (OFDMA)-based wireless protocol. If OFDMA protocols, wireless communication resources are split into sets of time-frequency resource blocks/units and multiple access is achieved by assigning subsets of the blocks/units to different client devices. FIG. 5 illustrates example time-frequency resource blocks/units 502 assigned to different UEs/STAs 504 in an OFDMA protocol. As shown, in each time slot, the APBS assigns a set of resource blocks to various clients. Although the example shown in FIG. 5 illustrates four resource blocks 502 in each time slot, embodiments may utilize any suitable number of resource blocks in each time slot.

In embodiments of the present disclosure, an APBS may assign resource blocks in each OFDMA slot using a neural network (NN) that has been previously trained using reinforcement learning (RL) techniques. Recently, Deep Reinforcement Learning (DRL)-based techniques have been applied to scheduling algorithms at wireless Base Stations (BS)/Access Points (AP) with promising results. The Deep Neural Networks (DNN) used in the DRL approaches have a fixed size input, and accordingly, may schedule only a particular number of users at each scheduling phase (e.g., in each time slot), which poses a problem in real usage scenarios where the number of users can be variable. Further, in certain instances, the device that performs scheduling, e.g., a WiFi AP, may have relatively limited compute capabilities and may not be able to implement a large scale DNN. Accordingly, embodiments of the present disclosure may implement a model-assisted DRL approach that combines a model-assisted solution with DRL-based scheduling and addresses both the variable input size and the DNN complexity issues.

In particular embodiments, for instance, users may be grouped based on metrics like proportional fairness (PF), queue lengths, etc., or randomly, and then a DRL-based solution may be used to schedule a subset of total users from each group. That is, K of N users, where K<N, may be scheduled in each scheduling round (e.g., in each OFDMA resource block of a time slot), and the K users may be selected in each round based on a number of factors, such as the proportional fairness, queue length, weighted past scheduling (e.g., how often the device has been selected in past rounds vs. other devices), etc. or a combination thereof.

Embodiments of the present disclosure can achieve performance comparable to a DRL algorithm using a larger DNN trained for the worst-case scenario of the maximum number of users in the system. Embodiments of the present disclosure may therefore achieve one or more advantages, including, but not limited to the following: 1) There is no strict upper bound on the maximum number of users that can be supported by the system as opposed to the case when a NN is trained for the worst case number of users, 2) Training may be faster and more energy efficient, and 3) Low-complexity DNNs can be used that achieve comparable performance to larger DNNs and are easier to implement on low-compute capable devices.

Prior works that use Deep RL based approaches for scheduling are either for a fixed number of users or train for the maximum number of users permitted in the system. However, training for a fixed number of users is not amenable to a practical solution, since the number of users in a wireless system may be dynamic and changing over time. Further, training for the maximum number of users increases the training time and the complexity of DNN architecture, which can cause issues with compute resource-limited devices.

Figure 6:
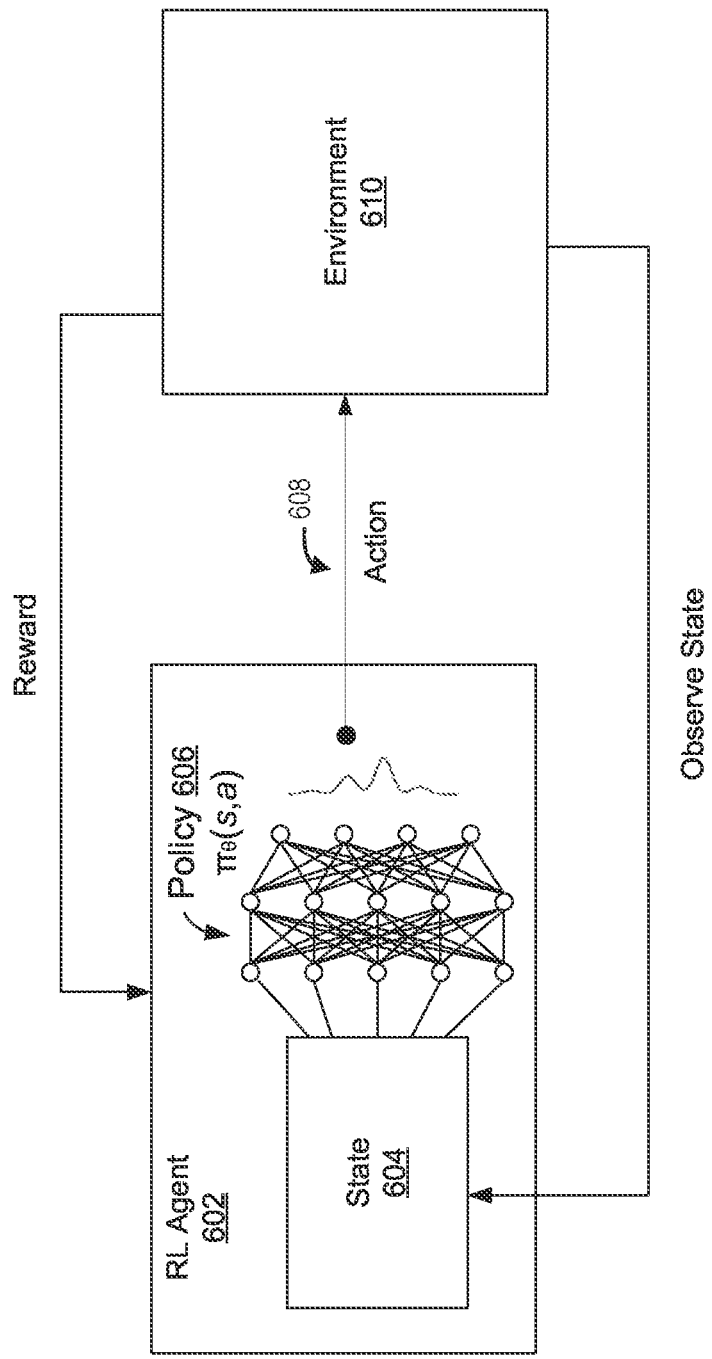
FIG. 6 illustrates an example deep reinforcement learning (DRL) system.
Figure 7:
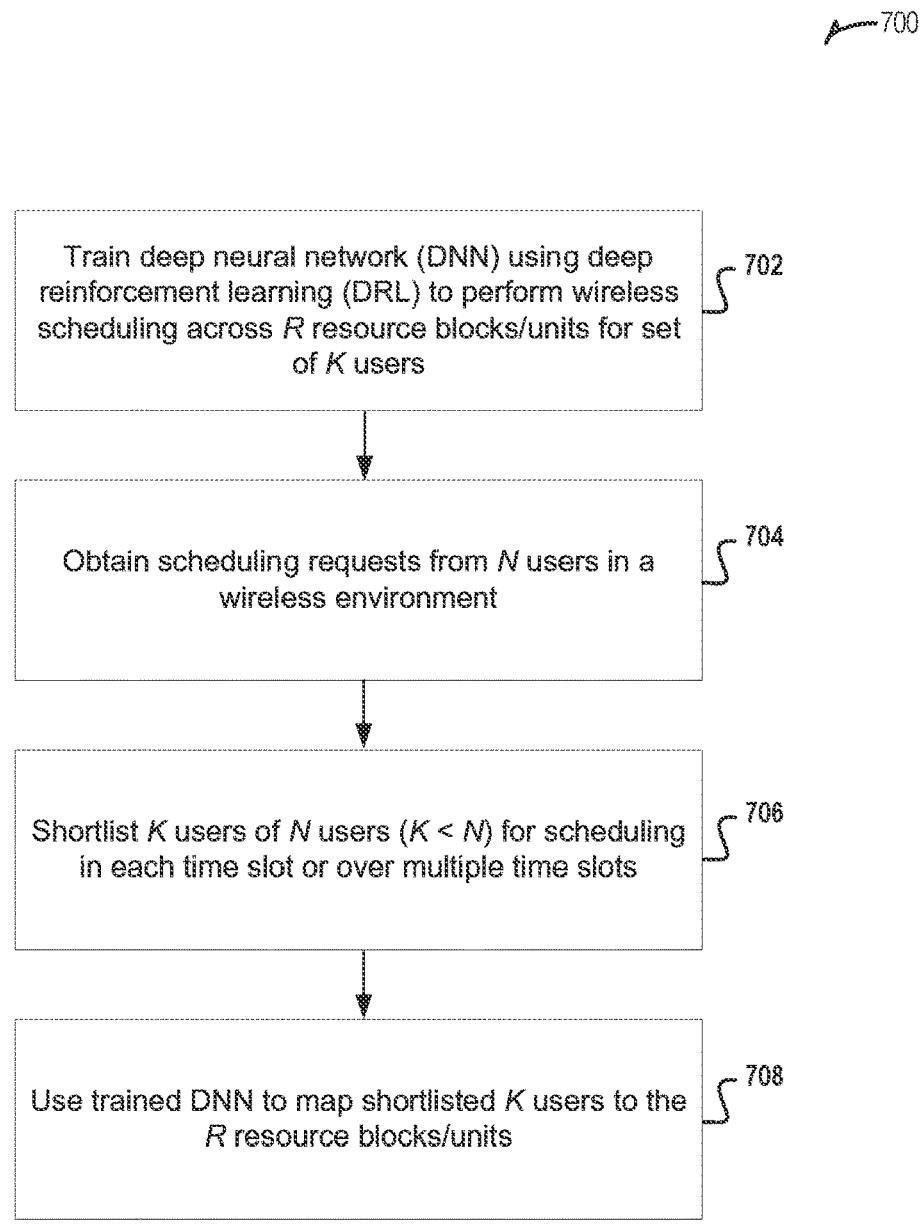
FIG. 7 illustrates an example DRL-based process for shortlisting and scheduling of devices in a wireless network.

A diagram of an example DRL approach is shown in FIGS. 6-7. In particular, FIG. 6 illustrates an example deep reinforcement learning (DRL) system 600, and FIG. 7 illustrates an DRL-based process 700 for shortlisting and scheduling of devices in a wireless network. The example process 700 may be implemented in software, firmware, hardware, or a combination thereof. For example, in some embodiments, operations in the example process shown may be performed by one or more components of an edge computing node, such as processor(s) (e.g., processor 1052) of an access point (e.g., 4G or 5G base station or WiFi AP or router). In some instances, certain operations of FIG. 7 may be performed by one or more dedicated circuitries within the computing node (e.g., a dedicated circuit for each operation shown). In some embodiments, one or more computer-readable media may be encoded with instructions that implement one or more of the operations in the example process 700 when executed by a machine (e.g., a processor of a computing node). The example process 700 may include additional or different operations, and the operations may be performed in the order shown or in another order. In some cases, one or more of the operations shown in FIG. 7 may be implemented as processes that include multiple operations, sub-processes, or other types of routines. In some cases, operations can be combined, performed in another order, performed in parallel, iterated, or otherwise repeated or performed another manner.

In the example shown in FIG. 6, the RL agent 602 (e.g., base station or access point) interacts directly with the environment 610 (e.g., wireless system or a simulated wireless system) by observing the system state $s_t$ (604) and performing an action $a_t$ (608) based on a policy (606). Following each action, the system undergoes a state transition to $s_{t+1}$ and also the agent receives a reward $r_t$. In certain instances, the state transitions and rewards are stochastic and Markovian in nature. The agent also may be initially unaware of the state transitions and the rewards, but may interact with the environment 610 and observe these quantities. The objective of the RL agent generally is to maximize the expected cumulative discounted reward $E[\Sigma_{t=0}^{\infty} \gamma^t r^t]$.

The agent 602 is guided by a stochastic policy 7C 606 which maps from state s 604 to action a 608. Hence, the policy is described as a probability distribution over actions, i.e., $\pi(s,a) \to [0, 1]$. To handle the exploding $\{s,a\}$ pair and the resulting "curse of dimensionality", deep neural networks (DNN) may be utilized to approximate the policy 606. Hence, the policy may be parametrized using $\theta$ as $\pi_\theta(s,a)$. One advantage of using DNNs is to avoid needing to hand-tune parameters.

Referring now to FIG. 7, at 702, a NN is trained to perform wireless scheduling (e.g., OFDMA scheduling) across R frequency resources (e.g., resource blocks/units 502 of FIG. 5) for a set of users K. The NN may be a deep neural network (DNN) that implements a policy gradient (PG) algorithm (e.g., $\pi$ as described with respect to FIG. 6) for some metric, such as sum throughput (a metric indicating an overall system performance, e.g., a total throughput for users) or proportional fairness (balancing throughput of the network while guaranteeing a minimal level of service for users). In certain embodiments, the NN may utilize a set of input variables that includes one or more of the following, for each user/device in the network, a channel rate, past throughput, queue length, header length (queue length), packet delay, etc. The NN may output a probability distribution over the K users for which it is trained.

In some embodiments, the NN may be trained by simulating a certain wireless environment as environment 610 in FIG. 6 and executing a NN-based policy as 606 to schedule resources (as actions 608) in the simulated environment 610. The goodputs (a measure of good/useful bits delivered) may be obtained for the resulting actions 608 at the end of a timeslot. The reward (e.g., the reward as described above with respect to FIG. 6) may measure the proportional fairness, e.g., $\Sigma_i \log \bar{\mu}_i$, where $\bar{\mu}_i$ is the average throughput of user i. The system state (e.g., state 604, $s_t$ as described above with respect to FIG. 6) may include the queue lengths Q(t) channel rates R(t), past throughputs $\bar{\mu}(t)$, or a counter to track last arrival A(t). A last arrival may refer to a time that has elapsed since a packet has arrived (a user that generates packets often will have a smaller value than a user which generates packets sporadically). These variables may also become inputs to the NN when deployed for use in scheduling resources. The input features may be time-varying and the dynamics may be determined by the traffic model, channel model and past actions. The input features may be normalized to take values in (0,1), e.g., by running several simulation traces.

Once the NN is trained, it can be deployed in a wireless network (e.g., an OFDMA-based wireless network) to schedule resource blocks/units. In particular, the NN may be used to schedule, in each time slot, the set of R available resource blocks in the slot to K users. In some instances, the number of users that need scheduling N (e.g., the number of scheduling requests obtained by the wireless BS/AP/accessed by its processor at 704) may be larger than the number of users K the NN is trained to schedule. To handle any arbitrary number of users N>K, at 706, the set of users N may be shortlisted to a fixed subset K. This allows a fixed size NN that is pre-trained using deep RL as described above to then be run (e.g., at 708) in highly-varying wireless conditions. Thus, as shown in FIG. 7, if a number of users N for which scheduling requests are obtained a is more than K at 704, a subset K of users are shortlisted at 706 (for each time slot or for a set of time slots) and the DNN is used at 708 to the schedule the K users in the R resource blocks/units. That is, the DNN may provide an output policy gradient (PG) that is used to schedule resources for the shortlisted K users.

In some embodiments, the shortlisting is performed for each time slot and the NN only schedules resources for the shortlisted K users in that slot, with this process repeating for each successive slot. That is, in a first slot, the set of N users is shortlisted to a first subset $K_1$ and only the subset $K_1$ of users are scheduled for the first slot, and in a second slot the set of N users (which may be the same as before, or may be different than before since the set of N users may be dynamic) is shortlisted to a second subset $K_2$ (which may be the same as $K_1$ or different from K1) and only the subset $K_2$ of users are scheduled for the second slot. In other embodiments, however, the shortlisting of users for each slot can be relaxed to shortlisting over multiple slots.

In some embodiments, the shortlisting may be performed using a random round robin (RRR) technique. In such a technique, each user in the set N is given an equal probability of being selected for the shortlist K. After the first user is selected for the shortlist K, each remaining user of the set N is re-assigned an equal probability of being selected and a second user is selected for the shortlist K This continues until the shortlist K is complete for the slot (or set of slots), and then the shortlisting process begins again for the set of N users in the next slot (or set of slots).

In some embodiments, the shortlisting may be performed using a model-based approach based on one or more metrics used by model-based schedulers, such as, for example, proportional fairness (PF), queue lengths, sum throughput, etc. In PF-based shortlisting, the set of N users may be sorted based on a measure of past throughput, i.e., how much throughput/bandwidth the user has received over time, and selected for the shortlist K based on the sorting. For instance, in some embodiments, the users may be sorted based on a ratio of $$\frac{R_i(t)}{\overline{R}_i(t)}$$

where $R_i(t)$ is the channel rate of user i in scheduling and $\overline{R}_i(t)$ is an exponential weighted average rate received by user i until scheduling slot t. The top K users in the sort of the ratio are then selected for scheduling. Thus, users that haven't received much throughput previously may be given a better chance at being shortlisted in future slots.

In queue-based shortlisting, the set of N users may be sorted based on an amount of data queued for the device (i.e., data that still remains to be scheduled for the user) and selected for the shortlist K based on the sorting. For instance, the K users with the largest queue lengths may be selected for the shortlist K. In some embodiments, the sorting the set of N users may be based on an instantaneous queue length (e.g., how many packets/bytes buffered for the users at the time of shortlisting). In other embodiments, the sorting of the set of N users may be based on a time average of queue length for the users, such that a first user that is generally sending more data than a second user will be more likely to be selected for the shortlist K.

Figure 8:
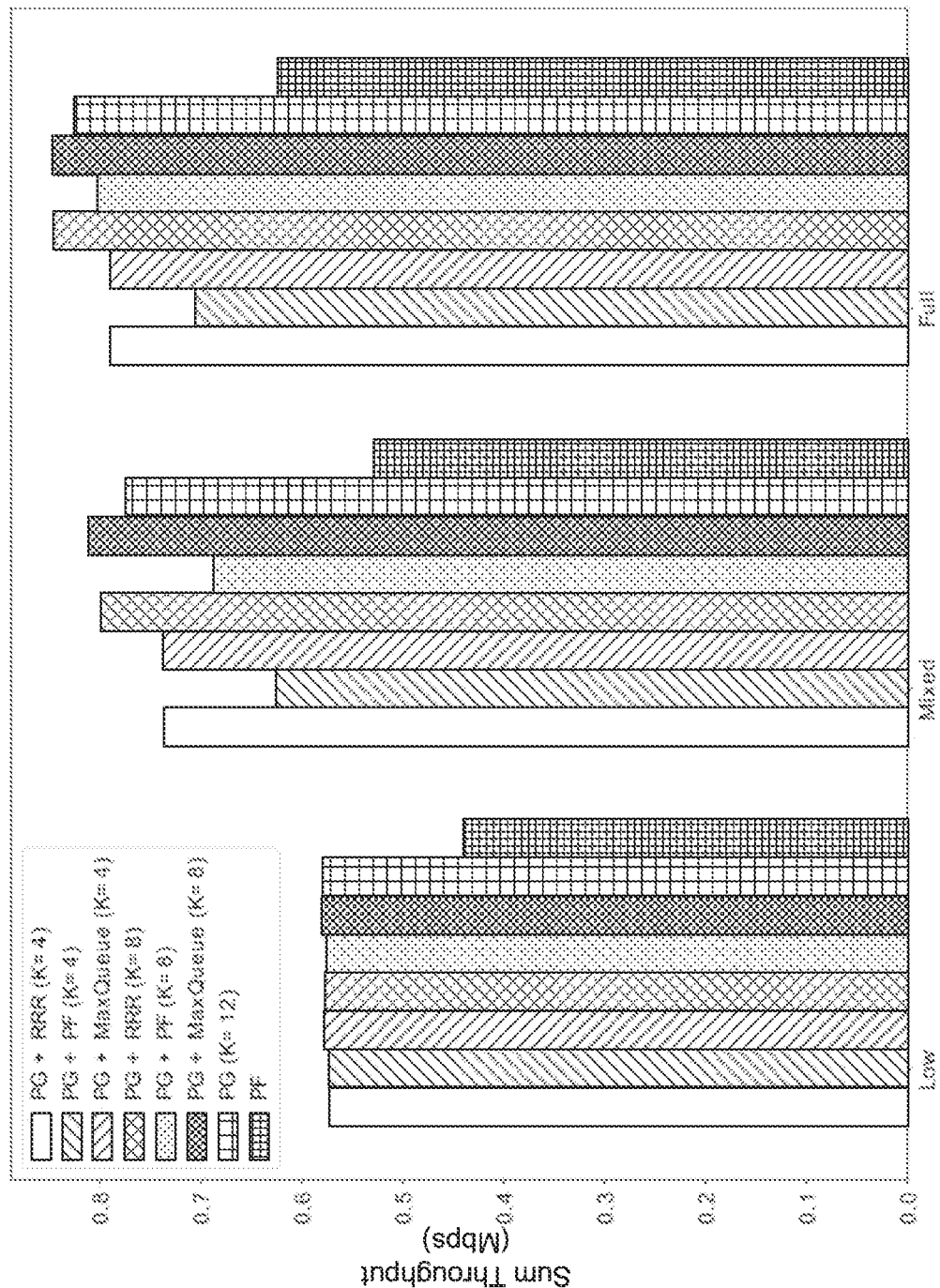
FIGS. 8-9 illustrate example simulation data for various example DRL-based scheduling techniques.
Figure 9:
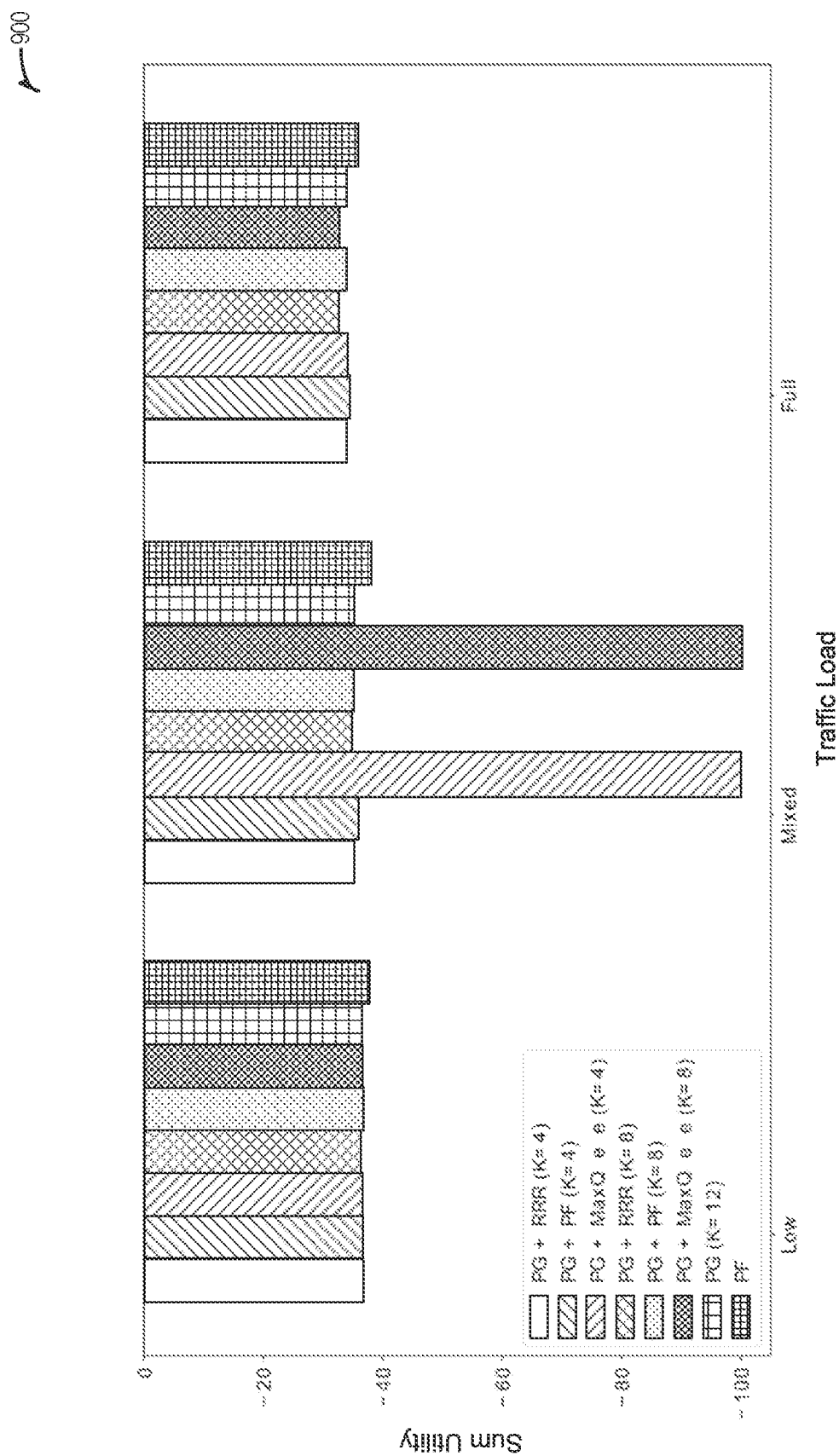

FIGS. 8-9 illustrate example simulation data for various example DRL-based scheduling techniques. In particular, FIGS. 8-9 show simulation data illustrating the performance of three different shortlisting algorithms, namely, (1) Random Round Robin (indicated as RRR in FIGS. 8-9) techniques; (2) Proportional Fair-based techniques (indicated as PF in FIGS. 8-9); and (3), queue-based techniques (indicated as MaxQueue in FIGS. 8-9)).

For the simulation, three different NNs which implement PG for K=4; 8; and 12, respectively, were trained, and only the input and output layers were changed with K; the hyper-parameters of the hidden layers remained constant in the simulation. The simulation considers a system with N=12 users and compares the performance of the following schemes: (1) RRR, PF, and MaxQueue grouping schemes combined with a NN trained for K=4; (2) RRR, PF, and MaxQueue grouping schemes combined with a NN trained for K=8; (3) an NN trained for K=12, i.e., no grouping scheme is used and a complete DRL solution is used; and (4) Model based Proportional Fair (PF) scheduling. Further, in the simulation, three different types of traffic were considered: 1) Low load: All users have traffic at a low utilization (20%) generated from Poisson distribution 2) Mixed load: 50% of the users have full buffer traffic and rest of users have low load traffic and 3) Full buffer: All users in the simulation have a full buffer of traffic to be scheduled.

The comparisons of sum throughput and sum utility metrics are shown in FIGS. 8 and 9, respectively. In the example shown, both sum throughput and sum utility metrics indicate that the performance with a NNs trained for K=4 and K=8 achieves comparable performance as a NN trained with K=12 with appropriate user selection mechanism in a system with N=12 while achieving 66.67% and 33.33% reduction in the number of model parameters, respectively.

It is shown that, for sum throughput, the MaxQueue-based grouping and RRR grouping techniques perform similarly or better than PG with K=12. Even with K=4, both the MaxQueue-based grouping and RRR grouping performs similarly (within 10%) to PG with K=12. For sum utility, it is shown that each technique has comparable performance, with the exception of the MaxQueue-based grouping technique. Key observations include: (1) The gains due to a model based DRL based solution suffer from diminishing returns with increasing K. Therefore, one can achieve a spectrum of trade-offs between the complexity of implementation and performance based on the number of users for which NN is trained; and (2) Choosing the right model assisted combining strategy may be important for achieving good performance with a model-assisted DRL based approach. Further, the model-assisted approaches for various performance metrics which gives close to optimal performance.

FIG. 10 illustrates a block diagram of example of components that may be present in an edge computing node 1050 for implementing the techniques (e.g., operations, processes, methods, and methodologies) described herein. The edge computing node 1050 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1050, or as components otherwise incorporated within a chassis of a larger system.

The edge computing device 1050 may include processing circuitry in the form of a processor 1052, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, California. As an example, the processor 1052 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-13 processor from Apple® Inc., a Snapdragon™ processor from Qualcomm® Technologies, Inc., or an OMAP™ processor from Texas Instruments, Inc. The processor 1052 and accompanying circuitry may be provided in a single socket form factor, multiple socket form factor, or a variety of other formats, including in limited hardware configurations or configurations that include fewer than all elements shown in FIG. 10.

The processor 1052 may communicate with a system memory 1054 over an interconnect 1056 (e.g., a bus) through an interconnect interface 1053 of the processor. The interconnect interface 1053 may include any input/output connection of the processor 1052 that allows the processor 1052 to be connected through interconnect 1056 to other components of the edge computing node 1050. The processor 1052 may include one or more processors and/or any type of processing circuitry. Any number of memory devices may be used to provide for a given amount of system memory. As examples, the memory 1054 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (QDP). These devices, in some examples, may be directly soldered onto a motherboard to provide a lower profile solution, while in other examples, the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or Mini-DIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1056 may couple the processor 1052 to a transceiver 1066, for communications with the connected edge devices 1062. The transceiver 1066 may be coupled to one or more antennas 1071 of the edge computing node 1050 to enable the edge computing node to wirelessly communicate with other edge computing nodes or other nodes in the wireless edge network. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the edge computing node 1050 may communicate with close devices, e.g., within about 10 meters, using a local transceiver based on Bluetooth Low Energy (BLE), or another low power radio, to save power. More distant connected edge devices 1062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1066 (e.g., a radio transceiver) may be included to communicate with devices or services in a cloud (e.g., an edge cloud 1095) via local or wide area network protocols. The wireless network transceiver 1066 may be a low-power wide-area (LPWA) transceiver that follows the IEEE 802.15.4, or IEEE 802.15.4g standards, among others. The edge computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the edge cloud 1095 or to other devices, such as the connected edge devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 1068, or 1070. Accordingly, in various examples, applicable means for communicating (e.g., receiving, transmitting, etc.) may be embodied by such communications circuitry.

The edge computing node 1050 may include or be coupled to acceleration circuitry 1064, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, global navigation system (e.g., GPS) sensors, pressure sensors, barometric pressure sensors, and the like. The hub or interface 1070 further may be used to connect the edge computing node 1050 to actuators 1074, such as power switches, valve actuators, an audible sound generator, a visual warning device, and the like.

In some optional examples, various input/output (I/O) devices may be present within or connected to, the edge computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1050. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1076 may power the edge computing node 1050, although, in examples in which the edge computing node 1050 is mounted in a fixed location, it may have a power supply coupled to an electrical grid, or the battery may be used as a backup or for temporary capabilities. The battery 1076 may be a lithium ion battery, or a metal-air battery, such as a zinc-air battery, an aluminum-air battery, a lithium-air battery, and the like.

A battery monitor/charger 1078 may be included in the edge computing node 1050 to track the state of charge (SoCh) of the battery 1076, if included. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LT7990 from Linear Technologies, an ADT7488A from ON Semiconductor of Phoenix Arizona, or an IC from the UCD90xxx family from Texas Instruments of Dallas, TX The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the edge computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the edge computing node 1050. A wireless battery charging circuit, such as an LTC4020 chip from Linear Technologies of Milpitas, California, among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the edge computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1082 on the processor 1052 (separately, or in combination with the instructions 1082 of the machine readable medium 1060) may configure execution or operation of a trusted execution environment (TEE) 1090. In an example, the TEE 1090 operates as a protected area accessible to the processor 1052 for secure execution of instructions and secure access to data. Various implementations of the TEE 1090, and an accompanying secure area in the processor 1052 or the memory 1054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1050 through the TEE 1090 and the processor 1052.

EXAMPLES

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

As referred to below, an "apparatus of" a server or "an apparatus of" a client or an "apparatus" of an edge compute node is meant to refer to a "component" of a server or client or edge computer node, as the component is defined above. The "apparatus" as referred to herein may refer, for example, include a compute circuitry, the compute circuitry including, for example, processing circuitry and a memory coupled thereto.

Example 1 includes an apparatus of an access point (AP) node of a network, the apparatus including an interconnect interface to connect the apparatus to one or more components of the AP node, and a processor to: obtain or access scheduling requests from a plurality of devices; select a subset of the devices for scheduling of resource blocks in a time slot; and schedule wireless resource blocks in the time slot for the subset of devices using a neural network (NN) trained via deep reinforcement learning (DRL).

Example 2 includes the subject matter of Example 1, wherein the processor is to select the subset of the devices using a random round robin selection.

Example 3 includes the subject matter of Example 1, wherein the processor is to select the subset of the devices based on a sorting of the subset of devices according to a measure of past throughput for each respective device of the subset.

Example 4 includes the subject matter of Example 3, wherein the measure of past throughput is a ratio of a channel rate for the device and an exponential weighted average rate previously received by the device.

Example 5 includes the subject matter of Example 1, wherein the processor is to select the subset of the devices based on a sorting of the subset of devices according to a measure of an amount of data queued for each respective device of the subset.

Example 6 includes the subject matter of Example 5, wherein the measure of the amount of data queued is one of an instantaneous queue length for the device and a time average of queue length for the device.

Example 7 includes the subject matter of any one of Examples 1-6, wherein the processor is further, for each successive time slot, to: select a new subset of the devices for scheduling of resource blocks in the time slot; and schedule wireless resource blocks in the time slot for the new subset of devices using the DRL-trained NN.

Example 8 includes the subject matter of any one of Examples 1-6, wherein the processor is further to: for a number of additional time slots, schedule wireless resource blocks in the additional time slots for the subset of devices using the DRL-trained NN; and after the number of additional time slots: select a new subset of the devices for scheduling of resource blocks in a next set of time slots; and schedule wireless resource blocks in the next set of time slots for the new subset of devices using the DRL-trained NN.

Example 9 includes the subject matter of any one of Examples 1-8, wherein inputs to the DRL-trained NN for scheduling wireless resource blocks include on one or more of queue lengths for each of the subset of devices, channel rates for each of the subset of devices, past throughputs for each of the subset of devices, and counters to track last arrivals for each of the subset of devices.

Example 10 includes the subject matter of any one of Examples 1-9, wherein the DRL-trained NN is trained to schedule the wireless resource blocks such that an average throughput of the subset of devices is optimized over time.

Example 11 includes the subject matter of any one of Examples 1-10, further comprising a wireless transceiver to couple the AP node to an IEEE 802.11-based network.

Example 12 includes the subject matter of any one of Examples 1-10, further comprising a wireless transceiver to couple the AP node to a cellular network.

Example 13 includes one or more computer-readable media comprising instructions that, when executed by one or more processors of an access point (AP) node of a network, cause the one or more processors to: obtain or access scheduling requests from a plurality of devices; select a subset of the devices for scheduling of resource blocks in a time slot; and schedule wireless resource blocks in the time slot for the subset of devices using a neural network (NN) trained via deep reinforcement learning (DRL).

Example 14 includes the subject matter of Example 13, wherein the instructions are to cause the one or more processors to select the subset of the devices using a random round robin selection.

Example 15 includes the subject matter of Example 13, wherein the instructions are to cause the one or more processors to select the subset of the devices based on a sorting of the subset of devices according to a measure of past throughput for each respective device of the sub set.

Example 16 includes the subject matter of Example 15, wherein the measure of past throughput is a ratio of a channel rate for the device and an exponential weighted average rate previously received by the device.

Example 17 includes the subject matter of Example 13, wherein the instructions are to cause the one or more processors to select the subset of the devices based on a sorting of the subset of devices according to a measure of an amount of data queued for each respective device of the subset.

Example 18 includes the subject matter of Example 17, wherein the measure of the amount of data queued is one of an instantaneous queue length for the device and a time average of queue length for the device.

Example 19 includes the subject matter of any one of Examples 13-18, wherein the instructions are to further cause the one or more processors, for each successive time slot, to: select a new subset of the devices for scheduling of resource blocks in the time slot; and schedule wireless resource blocks in the time slot for the new subset of devices using the DRL-trained NN.

Example 20 includes the subject matter of any one of Examples 13-18, instructions are to further cause the one or more processors to: for a number of additional time slots, schedule wireless resource blocks in the additional time slots for the subset of devices using the DRL-trained NN; after the number of additional time slots: select a new subset of the devices for scheduling of resource blocks in a next set of time slots; and schedule wireless resource blocks in the next set of time slots for the new subset of devices using the DRL-trained NN.

Example 21 includes the subject matter of any one of Examples 13-20, wherein inputs to the DRL-trained NN for scheduling wireless resource blocks include on one or more of queue lengths for each of the subset of devices, channel rates for each of the subset of devices, past throughputs for each of the subset of devices, and counters to track last arrivals for each of the subset of devices.

Example 22 includes the subject matter of any one of Examples 13-21, wherein the DRL-trained NN is trained to schedule the wireless resource blocks such that an average throughput of the subset of devices is optimized over time.

Example 23 includes the subject matter of any one of Examples 13-22, wherein the instructions are to schedule wireless resource blocks of an IEEE 802.11-based network.

Example 24 includes the subject matter of any one of Examples 13-22, wherein the instructions are to schedule wireless resource blocks of a cellular network.

Example 25 includes a method comprising: obtaining or accessing scheduling requests from a plurality of devices; selecting a subset of the devices for scheduling of resource blocks in a time slot; and scheduling wireless resource blocks in the time slot for the subset of devices using a neural network (NN) trained via deep reinforcement learning (DRL).

Example 26 includes the subject matter of Example 25, wherein the subset of the devices is selected using a random round robin selection.

Example 27 includes the subject matter of Example 25, wherein the subset of the devices is selected based on a sorting of the subset of devices according to a measure of past throughput for each respective device of the subset.

Example 28 includes the subject matter of Example 27, wherein the measure of past throughput is a ratio of a channel rate for the device and an exponential weighted average rate previously received by the device.

Example 29 includes the subject matter of Example 25, wherein the subset of the devices is selected based on a sorting of the subset of devices according to a measure of an amount of data queued for each respective device of the subset.

Example 30 includes the subject matter of Example 29, wherein the measure of the amount of data queued is one of an instantaneous queue length for the device and a time average of queue length for the device.

Example 31 includes the subject matter of any one of Examples 25-30, further comprising, for each successive time slot, to: selecting a new subset of the devices for scheduling of resource blocks in the time slot; and scheduling wireless resource blocks in the time slot for the new subset of devices using the DRL-trained NN.

Example 32 includes the subject matter of any one of Examples 25-30, further comprising: for a number of additional time slots, scheduling wireless resource blocks in the additional time slots for the subset of devices using the DRL-trained NN; after the number of additional time slots: selecting a new subset of the devices for scheduling of resource blocks in a next set of time slots; and scheduling wireless resource blocks in the next set of time slots for the new subset of devices using the DRL-trained NN.

Example 33 includes the subject matter of any one of Examples 25-32, wherein inputs to the DRL-trained NN for scheduling wireless resource blocks include on one or more of queue lengths for each of the subset of devices, channel rates for each of the subset of devices, past throughputs for each of the subset of devices, and counters to track last arrivals for each of the subset of devices.

Example 34 includes the subject matter of any one of Examples 25-33, wherein the DRL-trained NN is trained to schedule the wireless resource blocks such that an average throughput of the subset of devices is optimized over time.

Example 35 includes the subject matter of any one of Examples 25-34, wherein the wireless network is an IEEE 802.11-based network.

Example 36 includes the subject matter of any one of Examples 25-34, wherein the wireless network is a cellular network.

Example 37 includes an apparatus comprising means to perform a method in any one of Examples 25-36.

Example 38 includes machine-readable storage including machine-readable instructions, when executed, to implement a method as in any one of Examples 25-36 or realize an apparatus as in Example 37.

Example P1 includes a method comprising receiving requests from a plurality of devices (N) to schedule wireless resources for the devices on a wireless network; selecting a subset of the devices (K) using a neural network (NN) trained via deep reinforcement learning (DRL); and scheduling wireless resources for the subset of devices.

Example P2 includes the subject matter of Example P1, and/or some other example(s) herein, and optionally, wherein the selection of the subset of the devices is based on one or more of: a random selection, a Proportional Fairness-based selection, and a queue-based selection.

Example P3 includes the subject matter of Example P2, and/or some other example(s) herein, and optionally, wherein the Proportional Fairness-based selection is performed based on a ratio of $$\frac{R_i(t)}{\overline{R}_i(t)}$$

where $R_a(t)$ is the channel rate of user i in scheduling and $\overline{R}_i(t)$ is an exponential weighted average rate received by user i until scheduling slot t.

Example P4 includes the subject matter of Example P2, and/or some other example(s) herein, and optionally, wherein the queue-based selection is based on comparing a queue size of each device, the queue being a set of data for transmission on the wireless network.

Example P5 includes the subject matter of any one of Examples P1-P4, and/or some other example(s) herein, and optionally, wherein the wireless network is a WiFi network, and the selection and scheduling is performed by an access point of the WiFi network.

Example P6 includes the subject matter of any one of Examples P1-P4, and/or some other example(s) herein, and optionally, wherein the wireless network is a cellular (e.g., 4G, 5G, 6G) network, and the selection and scheduling is performed by a base station of the cellular network.

Example P7 includes the subject matter of any one of Examples P1-P6, and/or some other example(s) herein, and optionally, wherein the state of the DRL-based training of the NN is based on one or more of the Queue lengths Q(t), channel rates R(t), past throughputs $\overline{\mu}(t)$, counter to track last arrival A(t).

Example P8 includes the subject matter of any one of Examples P1-P7, and/or some other example(s) herein, and optionally, wherein the reward for the DRL-based training of the NN is based on $\Sigma_i \log \overline{\mu}_i$ where $\overline{\mu}_i$ is the average throughput of user i.

Example P9 includes the subject matter of any one of Examples P1-P8, and/or some other example(s) herein, and optionally, wherein the central server a MEC server.

Example P10 includes the subject matter of any one of Examples P1-P8, and/or some other example(s) herein, and optionally, wherein the edge computing device is a client device.

Example P11 includes an apparatus comprising means to perform one or more elements of a method described in or related to any of Examples P1-P8 above, or any other method or process described herein.

Example P12 includes one or more non-transitory computer-readable media comprising instructions to cause an electronic device, upon execution of the instructions by one or more processors of the electronic device, to perform one or more elements of a method described in or related to any of examples P1-P8, or any other method or process described herein.

Example P13 includes an apparatus comprising logic, modules, or circuitry to perform one or more elements of a method described in or related to any of examples P1-P8, or any other method or process described herein.

Example P14 includes a method, technique, or process as described in or related to any of examples P1-P8, or portions or parts thereof.

Example P15 includes an apparatus comprising: one or more processors and one or more computer-readable media comprising instructions that, when executed by the one or more processors, cause the one or more processors to perform the method, techniques, or process as described in or related to any of examples P1-P8, or portions thereof.

Example P16 includes a signal as described in or related to any of examples P1-P8, or portions or parts thereof.

Example P17 includes a datagram, packet, frame, segment, protocol data unit (PDU), or message as described in or related to any of examples P1-P8, or portions or parts thereof, or otherwise described in the present disclosure.

Example P18 includes a signal encoded with data as described in or related to any of examples P1-P8, or portions or parts thereof, or otherwise described in the present disclosure.

Example P19 includes a signal encoded with a datagram, packet, frame, segment, protocol data unit (PDU), or message as described in or related to any of examples P1-P8, or portions or parts thereof, or otherwise described in the present disclosure.

Example P20 includes an electromagnetic signal carrying computer-readable instructions, wherein execution of the computer-readable instructions by one or more processors is to cause the one or more processors to perform the method, techniques, or process as described in or related to any of examples P1-P8, or portions thereof.

Example P21 includes a computer program comprising instructions, wherein execution of the program by a processing element is to cause the processing element to carry out the method, techniques, or process as described in or related to any of Examples 25-36 or P1-P8, or portions thereof.

Example P22 includes a signal in a wireless network as shown and described herein.

Example P23 includes a method of communicating in a wireless network as shown and described herein.

Example P24 includes a system for providing wireless communication as shown and described herein.

Example P25 includes a device for providing wireless communication as shown and described herein.

Example X1 includes a system comprising means to perform one or more elements of a method of any one of Examples 25-36 or P1-P8.

Example X2 includes a machine-readable storage including machine-readable instructions which, when executed, implement the method of any one of Examples 25-36 or P1-P8.

Example X3 includes a client compute node substantially as shown and described herein.

Example X4 includes a server node substantially as shown and described herein.

An example implementation is an edge computing system, including respective edge processing devices and nodes to invoke or perform the operations of Examples 25-36 or P1-P8, or other subject matter described herein.

Another example implementation is a client endpoint node, operable to invoke or perform the operations of Examples 25-36 or P1-P8, or other subject matter described herein.

Another example implementation is an aggregation node, network hub node, gateway node, or core data processing node, within or coupled to an edge computing system, operable to invoke or perform the operations of Examples 25-36 or P1-P8, or other subject matter described herein.

Another example implementation is an access point, base station, road-side unit, street-side unit, or on-premise unit, within or coupled to an edge computing system, operable to invoke or perform the operations of Examples 25-36 or P1-P8, or other subject matter described herein.

Another example implementation is an edge provisioning node, service orchestration node, application orchestration node, or multi-tenant management node, within or coupled to an edge computing system, operable to invoke or perform the operations of Examples 25-36 or P1-P8, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 25-36 or P1-P8, or other subject matter described herein.

Another example implementation is an edge computing system operable as an edge mesh, as an edge mesh with side car loading, or with mesh-to-mesh communications, operable to invoke or perform the operations of Examples 25-36 or P1-P8, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 25-36 or P1-P8, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of Examples 25-36 or P1-P8, or other subject matter described herein.

Another example implementation is an edge computing system adapted for mobile wireless communications, including configurations according to an 3GPP 4G/LTE or 5G network capabilities, operable to invoke or perform the use cases discussed herein, with use of Examples 25-36 or P1-P8, or other subject matter described herein.

Any of the above-described examples may be combined with any other example (or combination of examples), unless explicitly stated otherwise. Aspects described herein can also implement a hierarchical application of the scheme for example, by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc. Some of the features in the present disclosure are defined for network elements (or network equipment) such as Access Points (APs), eNBs, gNBs, core network elements (or network functions), application servers, application functions, etc. Any embodiment discussed herein as being performed by a network element may additionally or alternatively be performed by a UE, or the UE may take the role of the network element (e.g., some or all features defined for network equipment may be implemented by a UE).

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A method comprising:
accessing scheduling requests from a plurality of devices; and
scheduling wireless resource blocks in a plurality of time slots using a neural network (NN) trained via deep reinforcement learning (DRL) to schedule wireless resource blocks for a number K devices, the scheduling for each time slot comprising:
selecting a subset of K devices from the plurality devices; and
scheduling wireless resource blocks in the time slot for the subset of K devices using the DRL-trained NN.

2. The method of claim 1, wherein the subset of K devices is selected for each time slot using a random round robin selection.

3. The method of claim 1, wherein the subset of K devices is selected for each time slot based on a sorting of the plurality of devices according to a measure of past throughput for each respective device of the plurality of devices.

4. The method of claim 3, wherein the measure of past throughput is a ratio of a channel rate for the device and an exponential weighted average rate previously received by the device.

5. The method of claim 1, wherein the subset of K devices is selected for each time slot based on a sorting of the plurality of devices according to a measure of an amount of data queued for each respective device of the plurality of devices.

6. The method of claim 5, wherein the measure of the amount of data queued is one of an instantaneous queue length for the device and a time average of queue length for the device.

7. An apparatus of an access point (AP) node of a network, the apparatus including an interconnect interface to connect the apparatus to one or more components of the AP node, and a processor to:
   access scheduling requests from a plurality of devices; and
   schedule wireless resource blocks in a plurality of time slots using a neural network (NN) trained via deep reinforcement learning (DRL) to schedule wireless resource blocks for a number K devices, wherein the processor is to schedule wireless resource blocks for each time slot by:
      selecting a subset of K devices from the plurality devices; and
      scheduling wireless resource blocks in the time slot for the subset of K devices using the DRL-trained NN.

8. The apparatus of claim 7, wherein the processor is to select the subset of K devices for each time slot using a random round robin selection.

9. The apparatus of claim 7, wherein the processor is to select the subset of K devices for each time slot based on a sorting of the plurality of devices according to a measure of past throughput for each respective device of the plurality of devices.

10. The apparatus of claim 9, wherein the measure of past throughput is a ratio of a channel rate for the device and an exponential weighted average rate previously received by the device.

11. The apparatus of claim 7, wherein the processor is to select the subset of K devices for each time slot based on a sorting of the plurality of devices according to a measure of an amount of data queued for each respective device of the plurality of devices.

12. The apparatus of claim 11, wherein the measure of the amount of data queued is one of an instantaneous queue length for the device and a time average of queue length for the device.

13. The apparatus of claim 7, wherein the processor is further, for each successive time slot, to:
   select a new subset of K devices for scheduling of resource blocks in the time slot; and
   schedule wireless resource blocks in the time slot for the new subset of devices using the DRL-trained NN.

14. The apparatus of claim 7, wherein the processor is further to:
   for a number of additional time slots, schedule wireless resource blocks in the additional time slots for the subset of devices using the DRL-trained NN; and
   after the number of additional time slots:
      select a new subset of K devices for scheduling of resource blocks in a next set of time slots; and
      schedule wireless resource blocks in the next set of time slots for the new subset of devices using the DRL-trained NN.

15. The apparatus of claim 7, wherein inputs to the DRL-trained NN for scheduling wireless resource blocks include on one or more of queue lengths for each of the subset of devices, channel rates for each of the subset of devices, past throughputs for each of the subset of devices, and counters to track last arrivals for each of the subset of devices.

16. The apparatus of claim 7, wherein the DRL-trained NN is trained to schedule the wireless resource blocks such that an average throughput of the subset of devices is optimized over time.

17. The apparatus of claim 7, further comprising a wireless transceiver to couple the AP node to an IEEE 802.11-based network.

18. The apparatus of claim 7, further comprising a wireless transceiver to couple the AP node to a cellular network.

19. One or more non-transitory computer-readable media comprising instructions that, when executed by one or more processors of an access point (AP) node of a network, cause the one or more processors to:
   access scheduling requests from a plurality of devices; and
   schedule wireless resource blocks in a plurality of time slots using a neural network (NN) trained via deep reinforcement learning (DRL) to schedule wireless resource blocks for a number K devices, the scheduling for each time slot comprising:
      selecting a subset of K devices from the plurality devices; and
      scheduling wireless resource blocks in the time slot for the subset of K devices using the DRL-trained NN.

20. The computer-readable media of claim 19, wherein the instructions are to cause the one or more processors to select the subset of K devices for each time slot using a random round robin selection.

21. The computer-readable media of claim 19, wherein the instructions are to cause the one or more processors to select the subset of K devices for each time slot based on a sorting of the plurality of devices according to a measure of past throughput for each respective device of the plurality of devices.

22. The computer-readable media of claim 21, wherein the measure of past throughput is a ratio of a channel rate for the device and an exponential weighted average rate previously received by the device.

23. The computer-readable media of claim 19, wherein the instructions are to cause the one or more processors to select the subset of K devices for each time slot based on a sorting of the plurality of devices according to a measure of an amount of data queued for each respective device of the plurality of devices.

24. The computer-readable media of claim 23, wherein the measure of the amount of data queued is one of an instantaneous queue length for the device and a time average of queue length for the device.

25. The computer-readable media of claim 19, wherein the instructions are to further cause the one or more processors, for each successive time slot, to:
   select a new subset of K devices for scheduling of resource blocks in the time slot; and
   schedule wireless resource blocks in the time slot for the new subset of devices using the DRL-trained NN.

* * * * *